United States Patent
Fitzgerald

(10) Patent No.: US 6,880,834 B2
(45) Date of Patent: Apr. 19, 2005

(54) BI-DIRECTIONAL SNOW SLED WITH STEERING/BRAKING LEVERS

(75) Inventor: David J. Fitzgerald, Hayward, CA (US)

(73) Assignee: Wham-O, Inc., Emeryville, CA (US)

( * ) Notice: Subject to any disclaimer, the term of this patent is extended or adjusted under 35 U.S.C. 154(b) by 0 days.

(21) Appl. No.: 10/349,713

(22) Filed: Jan. 22, 2003

(65) Prior Publication Data

US 2004/0140636 A1 Jul. 22, 2004

(51) Int. Cl.⁷ .............................................. B62B 13/00
(52) U.S. Cl. ........................ 280/28.11; 280/18; 188/8
(58) Field of Search .......................... 280/18, 18.1, 19, 280/28, 11, 23.1; D12/11; 188/5, 8

(56) References Cited

U.S. PATENT DOCUMENTS

| | | | | |
|---|---|---|---|---|
| 364,910 A | * | 6/1887 | Doty | 188/8 |
| 1,276,927 A | * | 8/1918 | Johnsen | 188/8 |
| 2,551,906 A | * | 5/1951 | Schaffhausen, Sr. | 280/18.1 |
| D219,463 S | * | 12/1970 | Diemond et al. | D12/11 |
| D219,827 S | * | 2/1971 | Mihalcheon | D12/11 |
| 3,948,536 A | * | 4/1976 | Konrad | 280/18 |
| 4,603,870 A | * | 8/1986 | Monreal | 280/18 |
| D394,616 S | * | 5/1998 | Niemeyer | D12/11 |
| 6,655,701 B1 | * | 12/2003 | Oberpriller | 280/21.1 |

FOREIGN PATENT DOCUMENTS

| | | | |
|---|---|---|---|
| CA | 0604520 | * | 9/1960 |
| CH | 396650 | * | 6/1968 |
| FR | 373466 | * | 3/1907 |

* cited by examiner

*Primary Examiner*—Bryan Fischmann
(74) *Attorney, Agent, or Firm*—Kolisch Hartwell, P.C.

(57) ABSTRACT

A snow sled having a body with a top surface and a bottom surface, wherein the top surface is configured to receive a rider in at least one of a prone position and a seated position. The snow sled further including a brake mechanism pivotally mounted to the body for hand actuation to impede the speed of the snow sled, wherein the brake mechanism includes a handle end and a barbed end and wherein the brake mechanism has a first orientation for actuation when the rider is in a prone position and a second orientation for actuation when the rider is in a seated position.

8 Claims, 3 Drawing Sheets

BI-DIRECTIONAL SNOW SLED WITH STEERING/BRAKING LEVERS

FIELD OF THE INVENTION

The present invention relates generally to snow sleds. More specifically, the invention relates to snow sleds having steering and braking capability.

BACKGROUND OF THE INVENTION

Snow sleds are popular for winter recreational activities. Wham-O, Inc.'s SNOWBOOGIE® sleds have been used for recreation on snow covered hills during the winter. Typical snow sleds may be ridden in both a prone position and a seated position. Allowing for different riding positions enhances the functionality of a sled. Some riders prefer one position to another and by permitting different ridding positions a sled is more useful to a wider variety of riders.

One problem the typical sled faces is a lack of control. Often a rider cannot easily stop the sled or steer the sled. To address the control problem some snow sled designs include a braking mechanism to slow the sled down. Still other sled designs have included a steering mechanism, such as grooves, guides, or skis, to facilitate a rudimentary steering capability. One problem with these steering and braking designs is that the position and configuration of the braking and steering mechanisms limit the rider's ability to change between a prone riding position and a seated riding position.

It would be desirable to develop a snow sled that is easy to manufacture, has the needed structure that enables greater steering control and braking and provides a sled that can easily be ridden in either a prone position or and seated position.

SUMMARY OF THE INVENTION

A snow sled having a body with a top surface and a bottom surface, wherein the top surface is configured to receive a rider in at least one of a prone position and a seated position. The snow sled further including a brake mechanism pivotally mounted to the body for hand actuation to impede the speed of the snow sled, wherein the brake mechanism includes a handle end and a barbed end and wherein the brake mechanism has a first orientation for actuation when the rider is in a prone position and a second orientation for actuation when the rider is in a seated position.

DETAILED DESCRIPTION AND BEST MODE OF THE INVENTION

Figure 1:
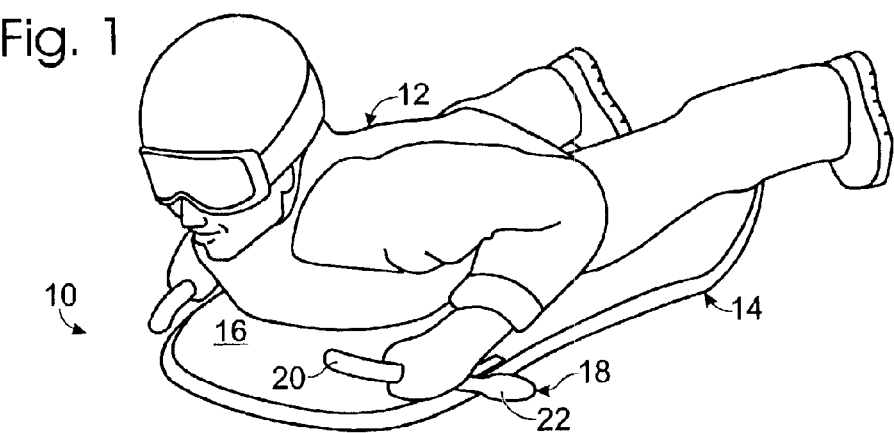
FIG. 1 is a perspective view of a snow sled according to one embodiment of the present invention, shown in a configuration for riding in a prone position with a prone rider thereon.
Figure 2:
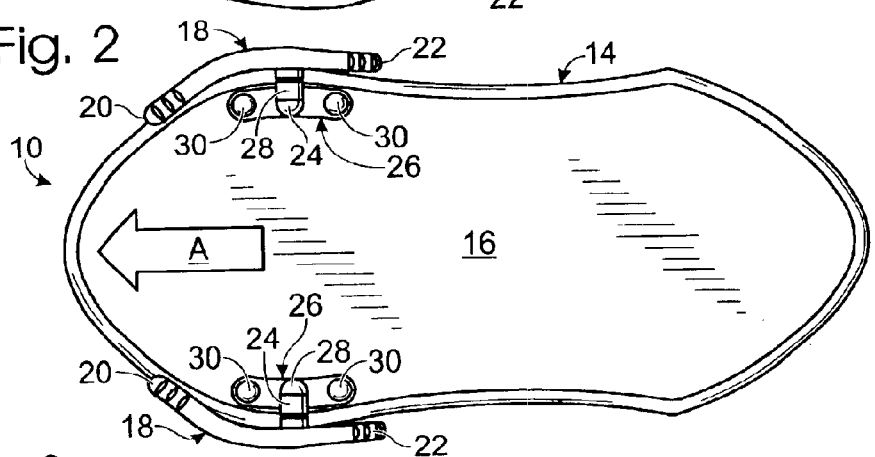
FIG. 2 is a top plan view of the snow sled of FIG. 1, showing the steering levers configured for prone riding.

A snow sled according to one embodiment of the present invention is shown in FIGS. 1 and 2, generally indicated at 10. Snow sled 10, shown in FIG. 1, with a rider 12 in a prone position on the sled, includes a braking structure. Sled 10 includes a body 14 configured to receive a rider on a top surface 16. Steering levers 18 are pivotally mounted to sled body 14 to form the braking mechanism or structure.

Steering levers 18, which form the braking mechanism, each include a handle end 20 and a dragging or braking end 22. Handle end 20 is configured for manual gripping, as illustrated in FIG. 1, by rider 12. Handle end 20 is curved inward toward body 14 of sled 10 to prevent handle end 20 from pivoting below top surface 16 of sled body 14. Preventing handles end 20 from rotating below body 14 prevents a rider from hitting their knuckles on the snow as the sled is traveling down a snow-covered hill.

As shown in FIG. 2, steering levers 18 also include pivot portion 24 positioned approximately one third of the length of the steering lever from braking end 22. A mounting bracket 26 attaches steering lever 18 to body 14 of sled 10. Mounting bracket 26 includes a raised region 28 configured to receive the pivot portion 24 of steering lever 18. Pivot portion 24 combined with raised region 28 form a pivot joint as will be described below with reference to FIGS. 8–10, that enables steering lever 18 to rotate relative to body 14. Mounting bracket 26 may be attached to body 14 by connecting pins 30. The connecting pins may be a press fit type.

Figure 3:
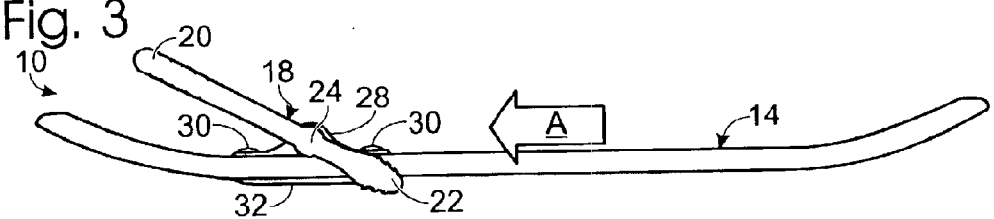
FIG. 3 is a side view of the snow sled of FIG. 1, showing the steering levers configured for prone riding.

FIGS. 2 and 3, show sled 10 in a configuration for riding in a prone position which can be referred to as the prone configuration. Directional arrow "A" indicates the direction of travel for sled 10, when in the prone configuration. Steering levers 18, in FIG. 2, are shown with handle end 20 raised and braking end 22 below the bottom of the sled body 14 in a position to drag in the snow and slow the sled down. It will be understood, that while riding the sled, handle ends 20 may be pivoted forward preventing braking end 22 from slowing the sled down when braking or steering is not desired. It will be further understood that a rudimentary steering can be effected by actuating, or pivoting upward only one of steering levers 16 to slow that side of the sled and induce a turn in the direction of the steering lever pivoted upward.

The steering action enabled by steering levers 16 may be understood in the following manner. As shown in FIG. 2, sled 10 includes a pair of steering levers 16 one lever on each side of sled 10. Directional arrow "A" indicates the direction of travel for sled 10. Steering levers 16 are configured for riding the sled in a prone position. A rider lifting the handle end of steering lever 16, positioned on the right side of sled 10, forces the braking end 22 downward into the snow inducing drag on the right side of the sled. Drag causes the right side of the sled to slow down. This slow down of the right side of the sled causes the sled to turn to the right.

Similarly, a rider may lift the steering lever on the left side of the sled to cause the sled to turn to the left. If the rider wants to slow the sled down, then the rider can lift both steering levers at the same time causing both braking ends 22 to induce drag on both sides of the sled, thus slowing the sled down. This steering system can be thought of as similar to how a tank steers by changing the speed of the tanks track on one side or the other to effect turning.

Figure 4:
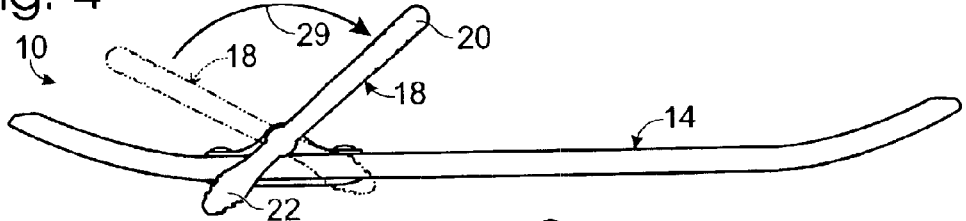
FIG. 4 is the side view of the snow sled of FIG. 3, showing the steering levers being converted from a configuration for riding in a prone position to a configuration for riding in seated position.
Figure 5:
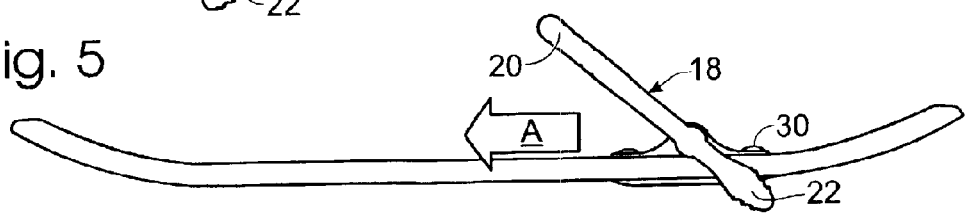
FIG. 5 is the side view of the snow sled of FIG. 3, showing the steering levers in a configuration for riding in a seated position and the snow sled oriented for feet first riding.

In FIGS. 4–5, sled 10 is being transformed from the prone configuration to a seated configuration for riding in a seated position. Transforming sled 10, from a prone configuration to a seated configuration involves two main steps. The first step involves rotating steering levers 16 and the second step involves turning the sled around.

In the first step, illustrated by FIG. 4, handle end 20 of steering lever 16 is rotated toward the rear end of sled 10. For purposes of this illustration, the rear end of sled 10 being the end distal from the point on body 14 where steering levers 16 are mounted. Arrow 29 illustrates this rotation of handle end 20 of the steering levers. This rearward rotation of handle ends 20 causes braking ends 22 to rotate forward toward the front of sled 10. With steering levers 16 rotated the sled is no longer configured for riding in the prone position. A rider in the prone position would not be able to hold the handle ends of steering levers 16 and steer or brake the sled.

In the second step, illustrated in FIG. 5, sled 10 is turned around so that the end, which was the rear end when the sled was in a prone configuration, is now pointing in the direction of travel for the seated position. That is to say, that what was the rear end becomes the front end and the sled travels in the direction indicated by arrow "A" of FIG. 5.

Figure 6:
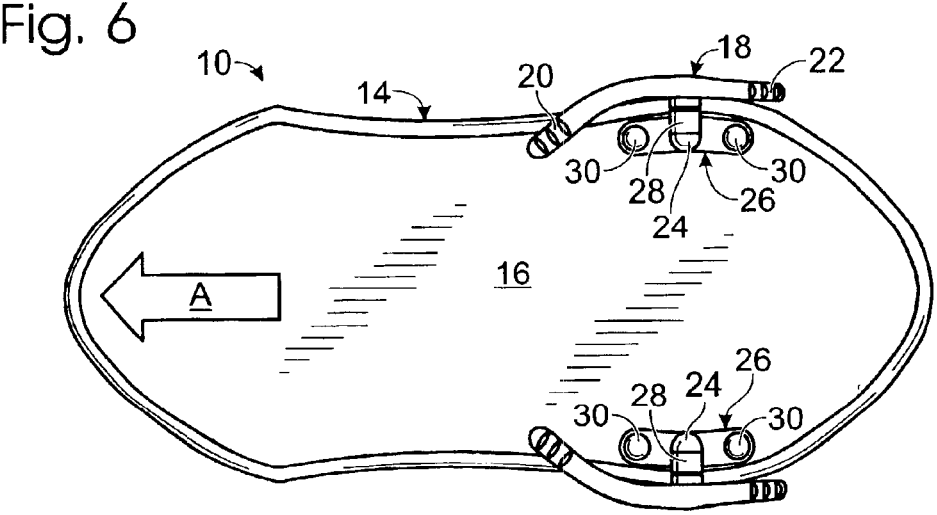
FIG. 6 is a top plan view of the snow sled of FIG. 1, shown in a configuration for riding in a seated position.
Figure 7:
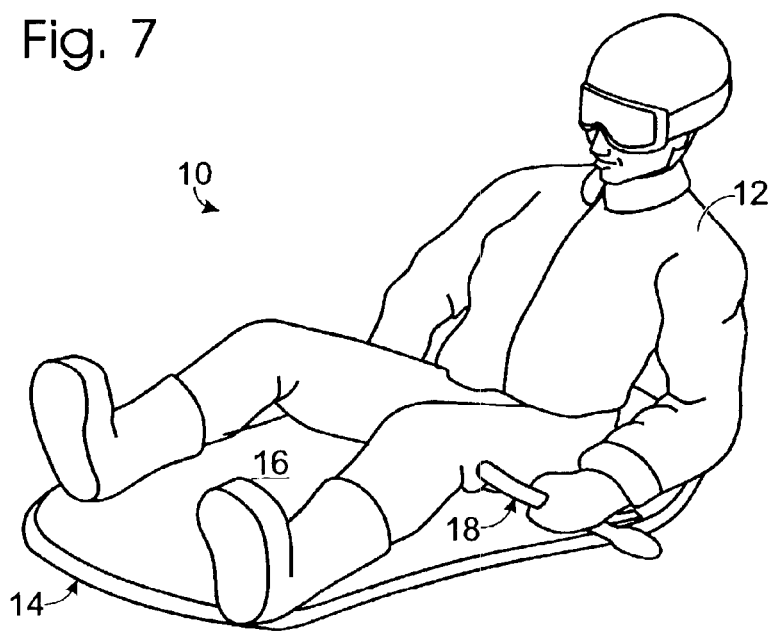
FIG. 7 is a perspective view of the snow sled of FIG. 1, illustrating a rider in the seated position.

FIGS. 6 and 7 show sled 10 in a configuration for accommodating a rider in a seated position. Rider 12 is shown in FIG. 7 in a seated position. Rider 12 in the seated position may use steering levers 16 in the same manner as described above to achieve braking and steering functions from this seated position because the orientation of the steering levers has rotated. In the seated configuration, a seated rider can effect rotation of the handle ends of the levers to cause the braking ends to drag in the snow. The rotation of the sled, illustrated in FIGS. 4 and 5, permit the sled to be effectively steered and slowed from the seated position.

FIG. 6 clearly illustrates that handle ends 22 of steering levers 16 curve inward and overlap the top of body 14 in this orientation. This overlap protects a rider's knuckles when riding sled 10 in a seated position. Downward rotation of steering levers 18 is stopped by contact with top surface 16 of sled body 14. Braking ends 22 of steering levers 22 may be rotated downward to slow the sled down, as discussed above.

Figure 8:
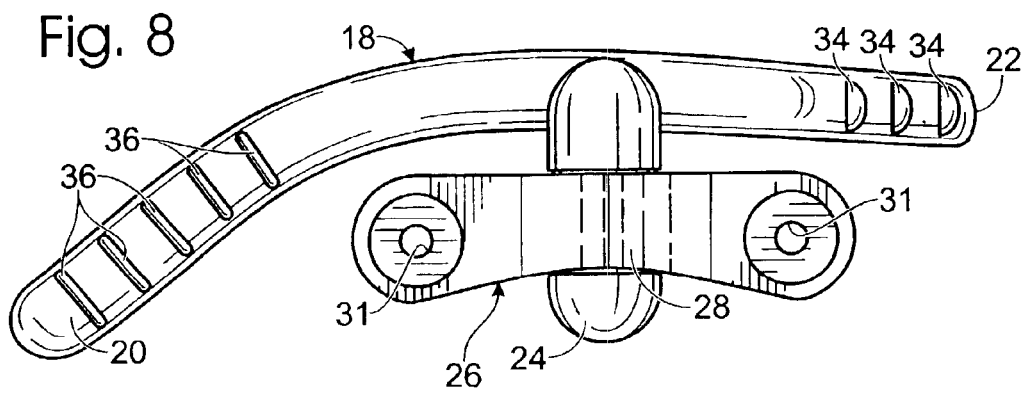
FIG. 8 is a top plan view of a steering lever and a pivot mount for a snow sled according to one embodiment of the present invention.
Figure 9:
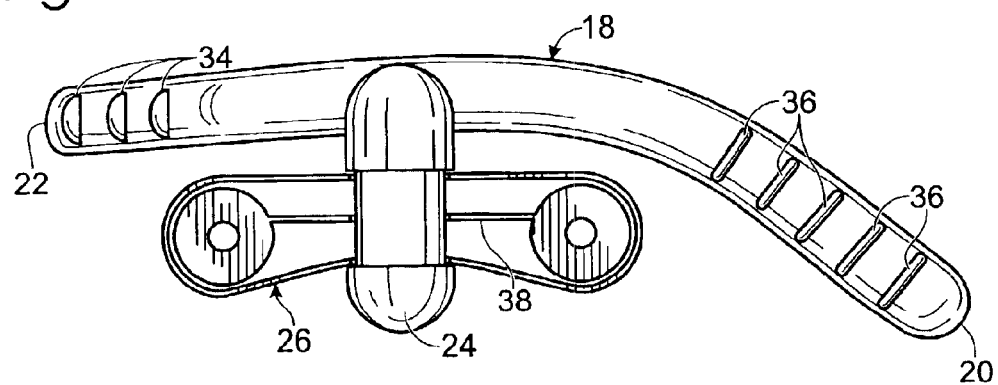
FIG. 9 is a bottom plan view of the steering lever and the pivot mount of FIG. 8.
Figure 10:
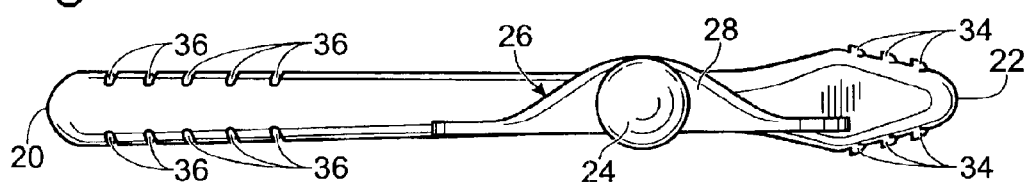
FIG. 10 is a side view of a steering lever according to one embodiment of the present invention.

FIGS. 8–10 show steering lever 16 and mounting bracket 26 in more detail. FIG. 8 shows a top-down plan view of steering lever 16 and mounting bracket 26. Steering lever 18 includes a series of barbs 34 positioned near the braking end 22 for improving the drag force of the braking end when it engages the snow. Positioned near handle end 20 of steering lever 16 is a series of detents 36 for improving the grip of a rider when riding the sled in either a seated or prone position. The detents 36 are shown as grooves in handle end 22 of steering lever 18, but it should be understood that any structure that improves a person's grip can be used for enhancing the handle end of steering lever 18.

Pivot bracket 26 includes a raised region 28 configured to receive pivot portion 24 of steering lever 18. Pivot bracket 26 includes pin apertures 31 configured to receive pins 30 for connecting the pivot bracket 26 to sled body 14. Connecting pins 30 may be any type of structure configured to secure pivot bracket 26 to guide rails 32. For example, connecting pin 30 may be constructed in accordance with the disclosure of U.S. patent application Ser. No. 10/096,359 of Gregory S. Lehr and Timothy G. Leonard for DUAL DENSITY FOAM CORE SPORTS BOARD, herein incorporated by reference for all purposes. Apertures 31 are configured to receive connecting pins 30 and attach the mounting bracket to guide rail 32.

FIG. 9 illustrates a bottom plan view of steering lever 18 and mounting bracket 26. It is clear from this view that barbs 34 and detents 36 are positioned on both the top side, as illustrated in FIG. 8, and on the bottom side as illustrated in FIG. 9. Placing handled detent 36 and barbs 34 on both the top side and the bottom side of steering lever 18 gives the steering levers similar levels of effectiveness in both the orientation for prone sled riding and the orientation for seated sled riding. Additionally, illustrated in FIG. 9, a reinforcement rib 38 is configured to strengthen the structure of mounting bracket 26. Reinforcement rib 38 contributes to the strength of mounting bracket 26 helping it withstand the forces exerted on it when steering lever 18 is being used to steer or slow the sled.

FIG. 10 illustrates a side view of steering lever 18 and mounting bracket 26. FIG. 10 further illustrates the region adapted to receive pivot portion 24 of steering lever 18. Braking end 22 of steering lever 18 is generally shaped as an arrowhead with a blunted rounded tip having two angled sides. Barbs 34 are positioned on these two angled sides so that as the braking end 22 is pressed into the snow by rotation of steering lever 18 barbs 34 dig further into the snow and increase the drag.

Figure 11:
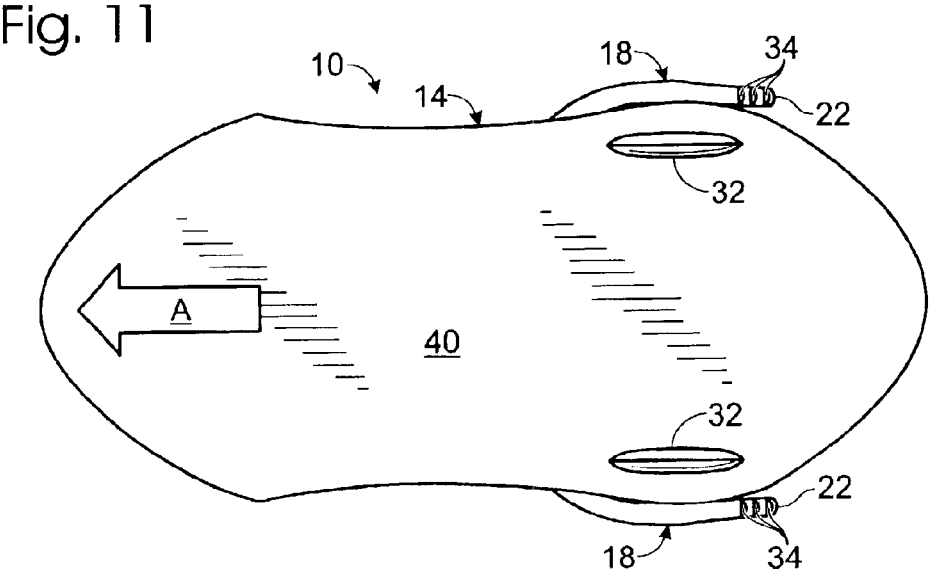
FIG. 11 is a bottom plan view of the snow sled of FIG. 1, showing the guide rails.

FIG. 11 shows the bottom side of sled 10 including slick surface 40 and guides 32. Slick surface 40 may be any slick surface configured to endure sledding friction. One example of a slick surface is disclosed in of U.S. patent application Ser. No. 10/096,359 of Gregory S. Lehr and Timothy G. Leonard for DUAL DENSITY FOAM CORE SPORTS BOARD, which has been incorporated by reference in to this application. Guide rails 32 strengthen mounting bracket 26 to sled 10. Guide rails 32 also enhance the tracking ability of sled 10. Tracking means the ability of sled 10 to travel in a relatively straight line in the direction the sled is pointed. Guide rails 32 have a long axis that parallels the length dimension of the sled. The length dimension, as used herein refers to the longer dimension of body 14 of sled 10. Guide rails are elongate and generally V-shaped in cross-section to form a groove in the snow and resist directional changes. The steering levers counter this tracking function when engaged to create drag.

It is believed that the disclosure set forth above encompasses multiple distinct inventions with independent utility. While each of these inventions has been disclosed in its preferred form, the specific embodiments thereof, as disclosed and illustrated herein, are not to be considered in a limiting sense as numerous variations are possible. The subject matter of the inventions include all novel and non-obvious combinations and sub-combinations of the various elements, features, functions and/or properties disclosed herein. Where claims recite "a" or "a first" element or equivalent thereof, such claims should be understood to include incorporation of one or more such elements, neither requiring, nor excluding two or more such elements.

It is believed that the following claims particularly point out certain combinations and sub-combinations that ate directed to one of the disclosed inventions and are novel and non-obvious. Inventions embodied in other combinations and sub-combinations of features, functions, elements and/or properties may be claimed through amendment of those claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

I claim:

1. A bi-directional snow sled comprising:
   a body having a first end and a second end wherein either end may function as the front of the sled; and
   a braking/steering lever pivotally mounted to the body for hand actuation to induce drag, wherein the lever includes a handle end and a braking end, the lever being pivotally movable in a first direction to create drag when the sled travels in a first direction, and pivotally movable in a second direction to create drag when the sled travels in a second direction.

2. The bi-directional snow sled of claim 1, wherein the braking/steering lever is mounted on a first side of the body with a mounting bracket.

3. The bi-directional snow sled of claim 2, wherein a second braking/steering lever is mounted on a second side with a mounting bracket, opposed to the braking/steering lever mounted on the first side, wherein actuation of the lever mounted on the first side causes the sled to turn toward the first side and actuation of the second lever causes the sled to turn toward the second side.

4. The bi-directional snow sled of claim 3 wherein the braking/steering levers are mounted on the sled body closer to the first end than to the second end.

5. The bi-directional snow sled of claim 1, wherein the braking end includes barbs configured to increase braking and steering force by increasing drag.

6. The bi-directional snow sled of claim 5, wherein the braking end includes an upper and lower surface that are tapered and a blunted end.

7. The bi-directional snow sled of claim 1, wherein the handle end is curved inward toward the body of the sled.

8. The bi-directional snow sled of claim 7, wherein the handle end is sufficiently curved to overlap the body of the sled, thereby preventing the handle end from rotating past a top surface of the body of the sled in either direction of rotation.

\* \* \* \* \*